(12) United States Patent
Henry et al.

(10) Patent No.: US 8,793,785 B2
(45) Date of Patent: Jul. 29, 2014

(54) REVOKEABLE MSR PASSWORD PROTECTION

(71) Applicant: VIA Technologies, Inc., New Taipei (TW)

(72) Inventors: G. Glenn Henry, Austin, TX (US); Terry Parks, Austin, TX (US)

(73) Assignee: Via Technologies, Inc., New Taipei (TW)

( * ) Notice: Subject to any disclaimer, the term of this patent is extended or adjusted under 35 U.S.C. 154(b) by 0 days.

(21) Appl. No.: 14/053,953

(22) Filed: Oct. 15, 2013

(65) Prior Publication Data

US 2014/0059358 A1 Feb. 27, 2014

Related U.S. Application Data

(62) Division of application No. 13/034,062, filed on Feb. 24, 2011, now Pat. No. 8,590,038.

(60) Provisional application No. 61/375,250, filed on Aug. 20, 2010.

(51) Int. Cl.
| | | |
|---|---|---|
| *G06F 12/14* | (2006.01) | |
| *G06F 21/31* | (2013.01) | |
| *G06F 9/30* | (2006.01) | |
| *G06F 21/78* | (2013.01) | |
| *G06F 21/79* | (2013.01) | |
| *G06F 21/71* | (2013.01) | |

(52) U.S. Cl.
CPC ............ *G06F 12/1408* (2013.01); *G06F 21/31* (2013.01); *G06F 9/30076* (2013.01); *G06F 21/78* (2013.01); *G06F 9/30101* (2013.01); *G06F 21/79* (2013.01); *G06F 21/71* (2013.01)

USPC ................. 726/18; 726/16; 726/17; 713/193; 711/163; 711/164

(58) Field of Classification Search
CPC ............ G06F 12/1408; G06F 9/30076; G06F 9/30101; G06F 21/17; G06F 21/78; G06F 21/79; G06F 21/31
USPC .......................................................... 726/18
See application file for complete search history.

(56) References Cited

U.S. PATENT DOCUMENTS

| | | |
|---|---|---|
| 5,889,679 A | 3/1999 | Henry et al. |
| 6,154,818 A | 11/2000 | Christie |
| 6,345,347 B1 | 2/2002 | Biran |
| 7,043,616 B1 | 5/2006 | McGrath |

(Continued)

*Primary Examiner* — Matthew Henning
(74) *Attorney, Agent, or Firm* — E. Alan Davis; James W. Huffman

(57) ABSTRACT

A microprocessor includes a model specific register (MSR) having an address, fuses manufactured with a first predetermined value, and a control register. The microprocessor initially loads the first predetermined value from fuses into the control register. The microprocessor also receives a second predetermined value into the control register from system software of a computer system comprising the microprocessor subsequent to initially loading the first predetermined value into the control register. The microprocessor prohibits access to the MSR by an instruction that provides a first password generated by encrypting a function of the first predetermined value and the MSR address with a secret key manufactured into the first instance of the microprocessor and enables access to the MSR by an instruction that provides a second password generated by encrypting the function of the second predetermined value and the MSR address with the secret key.

16 Claims, 5 Drawing Sheets

---

MANUFACTURER PROVIDES NEW BIOS RELEASE THAT WRITES VALUE TO FCR THAT INCLUDES SECOND FUSE VALUES, RATHER THAN FIRST FUSE VALUES, THEREBY EFFECTIVELY CONFIGURING THE PROCESSOR AS A "SECOND VERSION" IN THE SENSE THAT NOW FIRST PASSWORD DOES NOT WORK ON PROCESSOR WITH NEW BIOS RELEASE, I.E., FIRST PASSWORD IS REVOKED ON "SECOND VERSION" PROCESSOR 592

(56) References Cited

U.S. PATENT DOCUMENTS

| | | |
|---|---|---|
| 7,076,663 B2 | 7/2006 | Kelley et al. |
| 7,386,732 B2 | 6/2008 | Kelley et al. |
| 7,757,083 B2 | 7/2010 | Devadas et al. |
| 2005/0091520 A1* | 4/2005 | Khan et al. .................... 713/194 |
| 2009/0119748 A1 | 5/2009 | Yao et al. |
| 2009/0217375 A1 | 8/2009 | Joosten et al. |
| 2010/0064117 A1 | 3/2010 | Henry et al. |

* cited by examiner

MANUFACTURER GENERATION OF MSR PASSWORD

MSR ACCESS USING MSR PASSWORD

MANUFACTURER PROVIDES NEW BIOS RELEASE THAT WRITES VALUE TO FCR THAT INCLUDES SECOND FUSE VALUES, RATHER THAN FIRST FUSE VALUES, THEREBY EFFECTIVELY CONFIGURING THE PROCESSOR AS A "SECOND VERSION" IN THE SENSE THAT NOW FIRST PASSWORD DOES NOT WORK ON PROCESSOR WITH NEW BIOS RELEASE, I.E., FIRST PASSWORD IS REVOKED ON "SECOND VERSION" PROCESSOR 592

REVOKEABLE MSR PASSWORD PROTECTION

CROSS REFERENCE TO RELATED APPLICATION(S)

This application is a divisional application of U.S. Non-Provisional application Ser. No. 13/034,062, filed Feb. 24, 2011, which claims priority based on U.S. Provisional Application Ser. No. 61/375,250, filed Aug. 20, 2010, entitled REVOKEABLE MSR PASSWORD PROTECTION, which is hereby incorporated by reference in its entirety.

This application is related to U.S. patent application Ser. No. 12/781,087 (CNTR.2293), filed May 17, 2010, which is a continuation-in-part of U.S. Non-provisional application Ser. No. 12/391,781 (CNTR.2428), filed Feb. 24, 2009, which claims priority based on U.S. Provisional Application Ser. No. 61/095,350, filed Sep. 9, 2008. Additionally, U.S. patent application Ser. No. 12/781,087 (CNTR.2293) claims priority based on U.S. Provisional Application Ser. No. 61/232,236, filed Aug. 7, 2009.

This application is also related to U.S. patent application Ser. No. 12/391,781 (CNTR.2428), filed Feb. 24, 2009, which claims priority based on U.S. Provisional Application Ser. No. 61/095,350, filed Sep. 9, 2008.

This application is also related to U.S. patent application Ser. No. 12/609,207 (CNTR.2490), filed Oct. 30, 2009, which claims priority based on U.S. Provisional Application Ser. No. 61/158,026, filed Mar. 6, 2009.

Each of the above-referenced patent applications is hereby incorporated by reference in its entirety for all purposes.

FIELD OF THE INVENTION

The present invention relates in general to the field of restricted access to model specific registers of a microprocessor, and particularly to access restricted by password.

BACKGROUND OF THE INVENTION

A processor has many internal control registers that are normally accessible only by microcode. An example is a bus control register, which controls details such as timing on the processor bus, the exact bus protocols to be used, etc. In the process of testing and debugging a system in which the processor is employed, it is often desirable for the tester/debugger to be able to execute an external program to set (or read) these internal control registers. For example, the tester/debugger might want to try different timing on the processor bus. Furthermore, it is often desirable to access these internal registers as part of the manufacturing test process.

The x86 architecture, for example, includes the RDMSR and WRMSR instructions in its instruction set to read and write model specific registers (MSRs). A tester/debugger may access the internal control registers of an x86 processor via the RDMSR and WRMSR instructions. However, if not used correctly, accessing some of the internal control registers can cause the processor to work incorrectly, work slowly, or not work at all. Additionally, accessing some of the internal control registers can enable the user to bypass security mechanisms, e.g., allowing ring 0 access at ring 3. In addition, these control registers may reveal information that the processor designers wish to keep proprietary. For these reasons, the various x86 processor manufacturers have not publicly documented any description of the address or function of some control MSRs.

Nevertheless, the existence and location of the undocumented control MSRs are easily found by programmers, who typically then publish their findings for all to use. Furthermore, a processor manufacturer may need to disclose the addresses and description of the control MSRs to its customers for their testing and debugging purposes. The disclosure to the customer may result in the secret of the control MSRs becoming widely known, and thus usable by anyone on any processor.

A more rigorous approach goes a step further and requires that a secret "access key" be placed in a register prior to execution of a RDMSR/WRMSR to access a protected MSR. If the access key value is not correct, the RDMSR/WRMSR fails and the processor does not read/write the specified MSR. In theory, the key value must be obtained from the processor manufacturer. Unfortunately, soon after the manufacturer provides the key value to one customer, it may get publicized and other unauthorized people can use the publicized access key to access the control registers.

BRIEF SUMMARY OF INVENTION

In one aspect, the present invention provides a microprocessor. The microprocessor includes a model specific register (MSR) having an address. The microprocessor also includes fuses manufactured with a first predetermined value. The microprocessor also includes a control register. The microprocessor is adapted to initially load the first predetermined value from fuses into the control register. The microprocessor is also adapted to receive a second predetermined value into the control register from system software of a computer system comprising the microprocessor subsequent to initially loading the first predetermined value into the control register. The microprocessor is configured to prohibit access to the MSR by an instruction that provides a first password generated by encrypting a function of the first predetermined value and the MSR address with a secret key manufactured into the first instance of the microprocessor and is configured to enable access to the MSR by an instruction that provides a second password generated by encrypting the function of the second predetermined value and the MSR address with the secret key.

In yet another aspect, the present invention provides a method for revoking a first password used to access a model specific register (MSR) of a microprocessor. The method includes the microprocessor loading a first predetermined value from fuses of the microprocessor into a control register of the microprocessor. The method also includes writing a second predetermined value to the control register. The writing to the control register is performed by system software of a computer system comprising the microprocessor subsequent to loading the first predetermined value. The method also includes the microprocessor prohibiting access to the MSR by an instruction that provides a first password generated by encrypting a function of the first predetermined value and an address of the MSR with a secret key manufactured into the first instance of the microprocessor. The method also includes the microprocessor enabling access to the MSR by an instruction that provides a second password generated by encrypting the function of the second predetermined value and the address of the MSR with the secret key.

In yet another aspect, the present invention provides a computer program product encoded in at least one non-transitory computer usable medium for use with a computing device, the computer program product comprising computer usable program code embodied in the medium for specifying a microprocessor. The computer usable program code includes first program code for specifying a model specific register (MSR) having an address. The computer usable program code also includes second program code for specifying fuses manufactured with a first predetermined value. The computer usable program code also includes third program code for specifying a control register. The microprocessor is adapted to initially load the first predetermined value from fuses into the control register. The microprocessor is also adapted to receive a second predetermined value into the control register from system software of a computer system comprising the microprocessor subsequent to initially loading the first predetermined value into the control register. The microprocessor is configured to prohibit access to the MSR by an instruction that provides a first password generated by encrypting a function of the first predetermined value and the MSR address with a secret key manufactured into the first instance of the microprocessor and is configured to enable access to the MSR by an instruction that provides a second password generated by encrypting the function of the second predetermined value and the MSR address with the secret key.

DETAILED DESCRIPTION OF THE INVENTION

Figure 1:
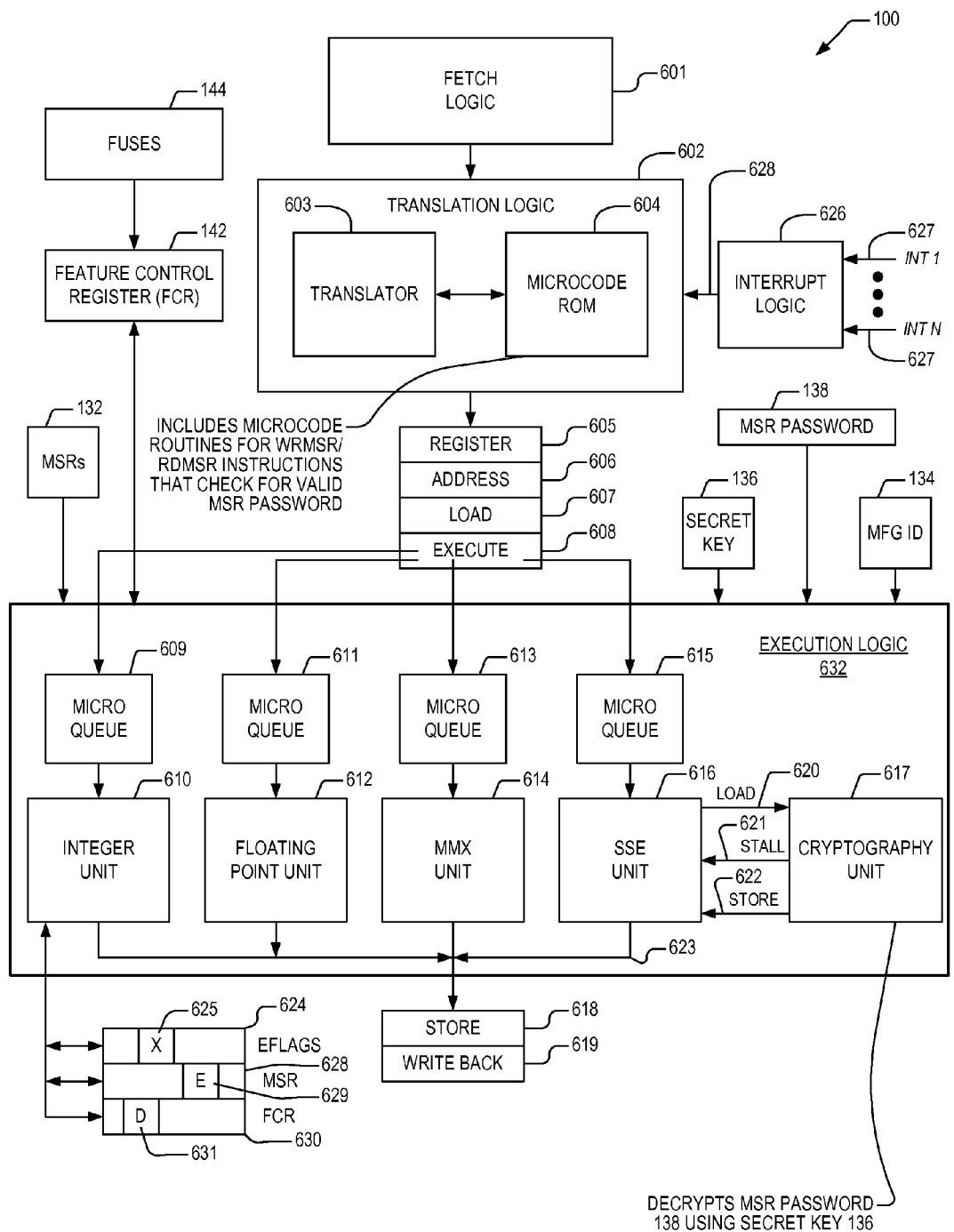
FIG. 1 is a block diagram illustrating a microprocessor according to the present invention.

U.S. patent application Ser. No. 12/781,087 (CNTR.2293) describes a way for a microprocessor manufacturer to limit access to model specific registers (MSR) by requiring a user to obtain a password from the manufacturer to access the MSRs. The microprocessor includes a manufacturing ID that uniquely identifies the processor part. Additionally, the microprocessor is manufactured with an internal secret key that is externally invisible and known only to the manufacturer. The manufacturer generates the password by encrypting the manufacturing ID using the secret key. Thus, the password is unique to the particular processor part. Prior to executing a RDMSR/WRMSR to access the MSR, a user program writes the password received from the manufacturer into a register of the microprocessor. When the processor encounters the RDMSR/WRMSR, an encryption engine within the processor decrypts the password using the secret key to generate a plaintext result. If the plaintext includes the manufacturing ID, then the processor completes the RDMSR/WRMSR, i.e., allows access to the specified MSR; otherwise, the processor aborts the RDMSR/WRMSR, i.e., denies access to the MSR.

U.S. patent application Ser. No. 12/781,087 (CNTR.2293) also describes an even more restrictive way to limit MSR access by encrypting both the unique manufacturing ID and the MSR number such that the password is unique not only to the particular processor part, but also to the particular MSR being accessed. The microprocessor selectively allows access by the RDMSR/WRMSR based on whether the plaintext includes both the manufacturing ID and the MSR number.

The present inventors have discovered that it would also be beneficial to provide a way for a microprocessor manufacturer to limit MSR access by providing a global password that is unique to each MSR. Therefore, embodiments are described herein in which the manufacturer encrypts the MSR number such that the password is unique to the particular MSR being accessed; however, because the unique manufacturing ID is not encrypted along with the MSR number, the password is not unique to the microprocessor part, thus making a password that is unique to the MSR but global to all microprocessors from the manufacturer of that type.

Furthermore, the global MSR-specific password might become public knowledge. Thus, ways to revoke the global MSR-specific password are provided herein. More specifically, the microprocessor includes one or more fuses that may be selectively blown during manufacturing of a microprocessor part. The manufacturer encrypts a function (e.g., XOR) of the value of the fuses and the MSR number to generate the global MSR-specific password which it supplies to the user. When the user attempts to access the MSR using the password, the microprocessor reads the fuse values and encrypts the function of the read fuse value and the user-specified MSR number and compares the encryption result with the user-supplied password and selectively allows access based on the comparison result. In this way, the manufacturer can blow a different value into the fuses of subsequently manufactured parts to accomplish revocation of the global MSR-specific password for the subsequently manufactured parts. Because strong encryption is used (e.g., 128-bit AES), an attacker cannot obtain the secret key even if he has the old password and the old fuse value, if even only a single bit of the fuse value was changed; therefore, he cannot predict the new password. An example of a situation in which it may be valuable to have the ability to revoke the global MSR-specific password is when an OEM requests a version of the microprocessor for which the global MSR-specific password is not publicly known, i.e., when the OEM wants to revoke the password for its own version of the microprocessor.

In one embodiment, the fuse values are loaded into a feature control register when the microprocessor is reset, and the microprocessor reads the fuse value from the feature control register when it encrypts the function of the value of the fuses and the MSR number. The feature control register is also writeable by software running on the microprocessor. This provides an alternate method to revoke the global MSR-specific password, namely by system software, such as BIOS.

Referring now to FIG. 1, a block diagram illustrating a microprocessor 100 according to the present invention is shown. The microprocessor 100 is similar to the microprocessor 100 described in FIG. 1 of U.S. patent application Ser. No. 12/781,087 (CNTR.2293) which is similar to the microprocessor 600 described in FIG. 6 of U.S. Pat. No. 7,321,910 (CNTR.2224), which is hereby incorporated by reference herein in its entirety for all purposes. However, the microprocessor 100 of FIG. 1 also includes a feature control register (FCR) 142 coupled to the execution logic 632. The microprocessor 100 also includes fuses 144 coupled to the FCR 142. In one embodiment, the fuses 144 are coupled to the execution logic 632 and at reset time the microprocessor 100 populates the FCR 142 with default values as modified by the fuse 144 values. In one embodiment, the default values are Boolean Exclusive-ORed (XOR) with the fuse 144 values. In one embodiment, microcode 604 reads the fuse 144 values and populates the FCR 142 with default values as modified by the fuse 144 values.

Embodiments for using the fuses 144 to populate the FCR 142 are described in U.S. Pat. No. 5,889,679 (CNTR.1328) and U.S. patent application Ser. No. 12/609,207 (CNTR.2490). The fuses 144 may be selectively blown by the microprocessor 100 manufacturer at manufacturing time.

Some of the MSRs 132 are password-protected and some are not. In one embodiment, the microcode ROM 604 stores a list of password-protected MSRs 132 that the microcode consults when it implements a RDMSR/WRMSR in order to determine whether to limit access, i.e., to require the valid password. In one embodiment, each MSR 132 has one of several different password-protection types. Described herein is a type in which an MSR 132 is protected according to a global MSR-specific password generated using the MSR 132 number and fuse 144 value associated with the particular version of the microprocessor 100 part. That is, the type is MSR-specific, but it is not part-specific, or at least is not part-specific within a set of parts manufactured with the same fuse value; however, as described herein, the MSR-specific password for a first set, or version, of parts blown with a first set of fuse 144 values will be different from the MSR-specific password for a second set, or version, of parts blown with a second set of fuse 144 values. This type is in addition to the types described in U.S. patent application Ser. No. 12/781,087 (CNTR.2293) in which an MSR 132 is protected according to a part-specific password generated using either the manufacturing ID of the microprocessor 100 part or both the manufacturing ID and the MSR 132 number. Furthermore, each MSR 132 may be further classified within the above types based on whether it is Protected for Read (for example, the MSR that is used to read out the microcode of the microprocessor 100), Protected for Write (for example, internal control registers that control the bus timing or protocol, or that control various performance or power saving features of the microprocessor 100), or Protected for both Read and Write.

The manufacturing ID 134 is a serial number manufactured into the microprocessor 100 hardware that is unique to each microprocessor 100 part. Because the manufacturing ID 134 is a serial number, it is a relatively predictable number. In one embodiment, the manufacturing ID 134 is a 50-bit number blown into fuses of the microprocessor 100. The manufacturing ID 134 is visible to users. In one embodiment, a user may read the manufacturing ID 134 via a RDMSR instruction.

The secret key 136 is a secret value manufactured into the hardware of the microprocessor 100 that is not externally visible. The secret key 136 is known only by a small number of authorized personnel of the manufacturer. The secret key 136 can be read internally by microcode of the microprocessor 100, but may not be read externally to the microprocessor 100. Thus, the secret key 136 cannot be obtained by any external program executing on the microprocessor 100; rather, the secret key 136 may only be obtained if one of the persons who know the secret key 136 reveals it or if someone examines the physical silicon and/or metal layers of the microprocessor 100 and discovers the location and arrangement of the secret key 136 manufactured into the hardware of the microprocessor 100. In one embodiment, the secret key 136 is the same for all instances of the microprocessor of the same manufacturer. In one embodiment, the secret encryption key 136 is 128 bits.

Figure 3:
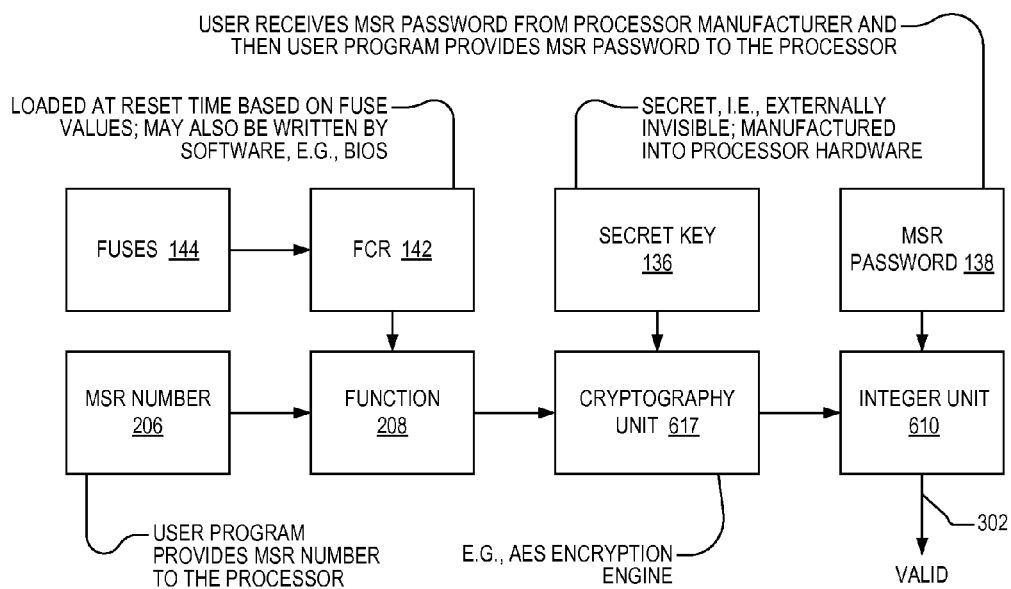
FIG. 3 is a block diagram pictorially describing the operation at blocks 408 through 432 of FIG. 4 according to the present invention.
Figure 4A:
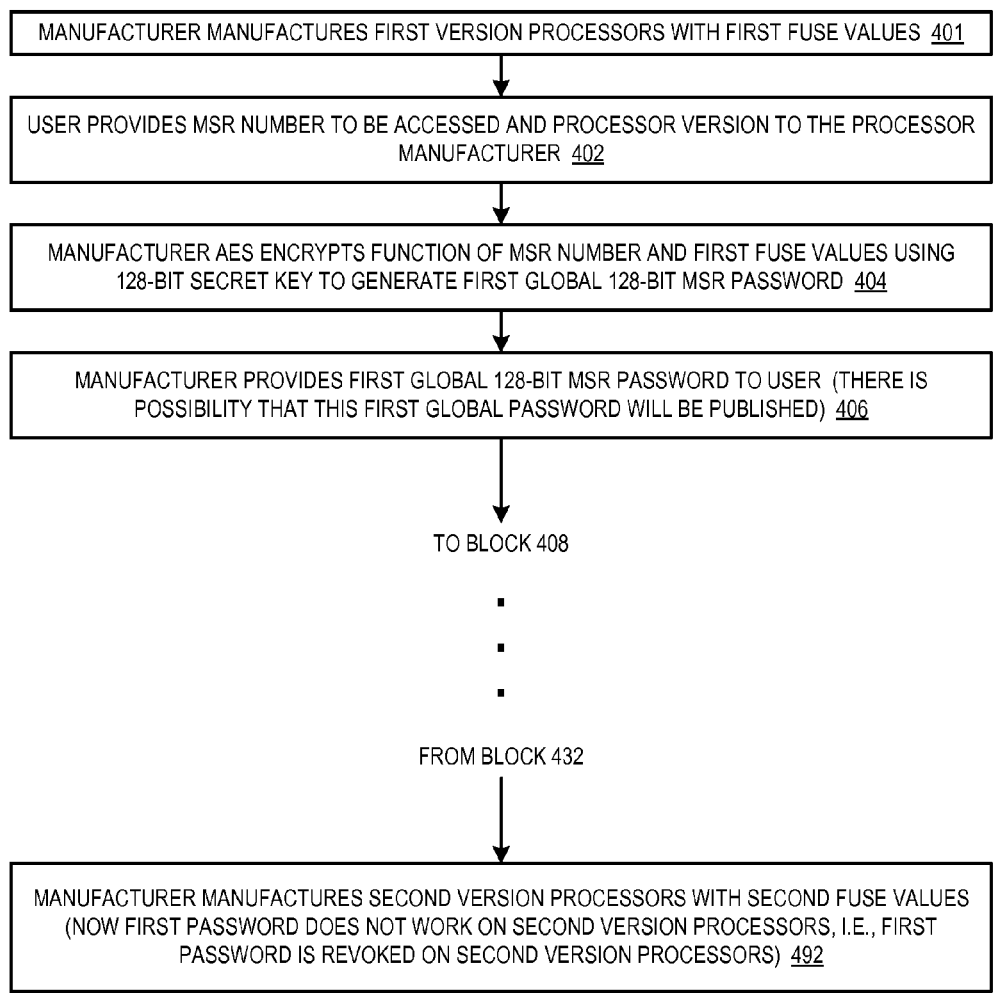
FIGS. 4A and 4B are a flowchart illustrating operation according to one embodiment of the present invention.
Figure 4B:
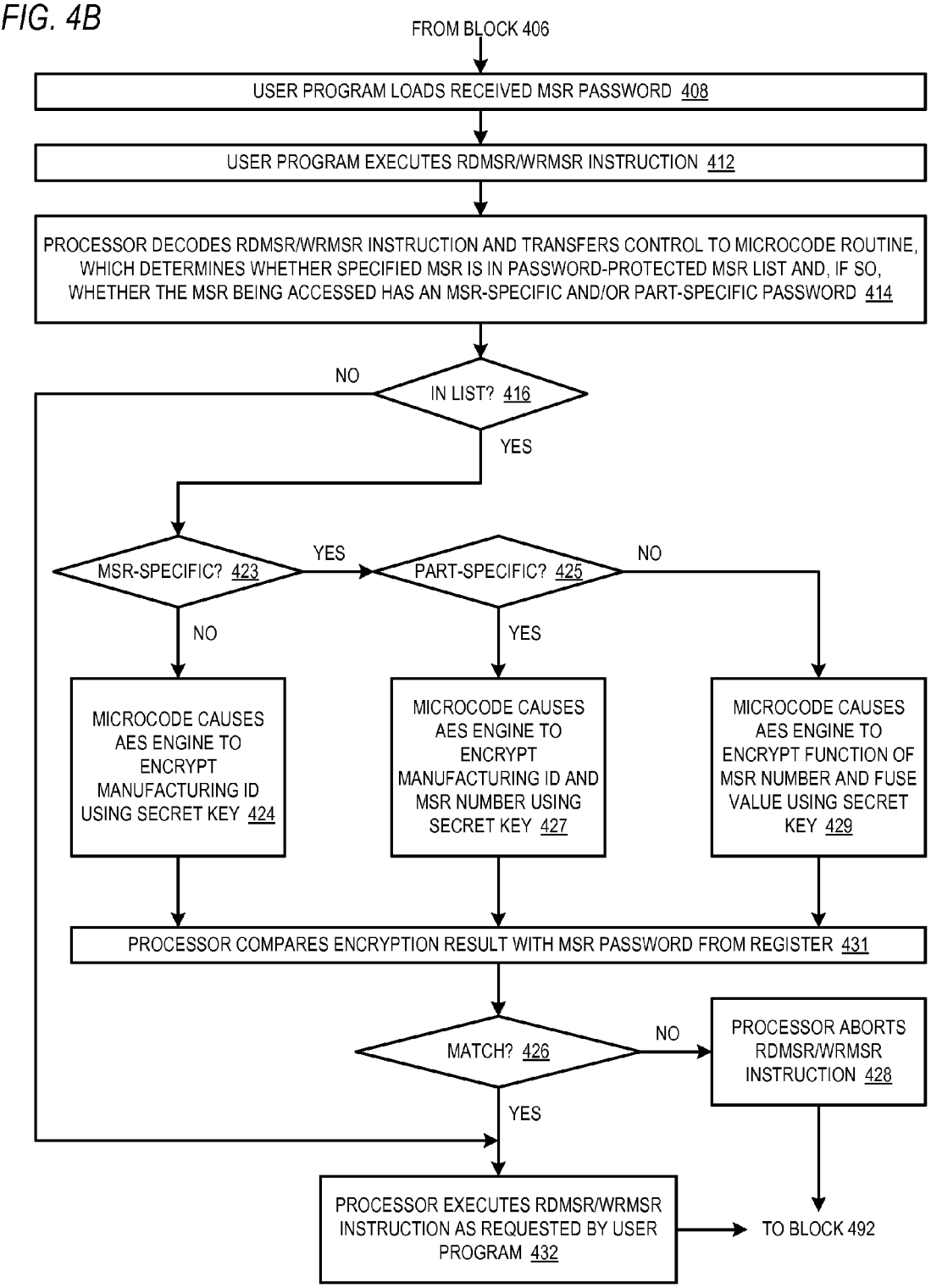

Referring now to FIG. 4, a flowchart illustrating operation according to one embodiment of the present invention is shown. FIG. 4 is broken into two drawing sheets denoted FIG. 4A and FIG. 4B. FIG. 4A includes blocks 401 through 406 and block 492; FIG. 4B includes block 408 through 432. The steps described in blocks 402 through 406 of FIG. 4A are also described pictorially in the block diagram of FIG. 2, and many of the steps described in blocks 408 through 432 of FIG. 4B are also described pictorially in the block diagram of FIG. 3. Thus, FIGS. 2 and 3 will also be described along with the description of FIG. 4. Flow begins at block 401.

At block 401, the microprocessor 100 manufacturer manufactures a first version set of microprocessor 100 parts. The first version includes a first fuse value 204 (of FIG. 2) selectively blown into the fuses 144 of FIG. 1. Flow proceeds to block 402.

At block 402, the user desires to read/write an MSR 132 of his microprocessor 100, so he provides the microprocessor 100 manufacturer the number, or address, of the MSR 132 and requests an MSR password 138. The user also provides the microprocessor 100 version to the manufacturer, which enables the manufacturer to ascertain the fuse value 204 that was blown into the user's microprocessor 100 version. Flow proceeds to block 404.

Figure 2:
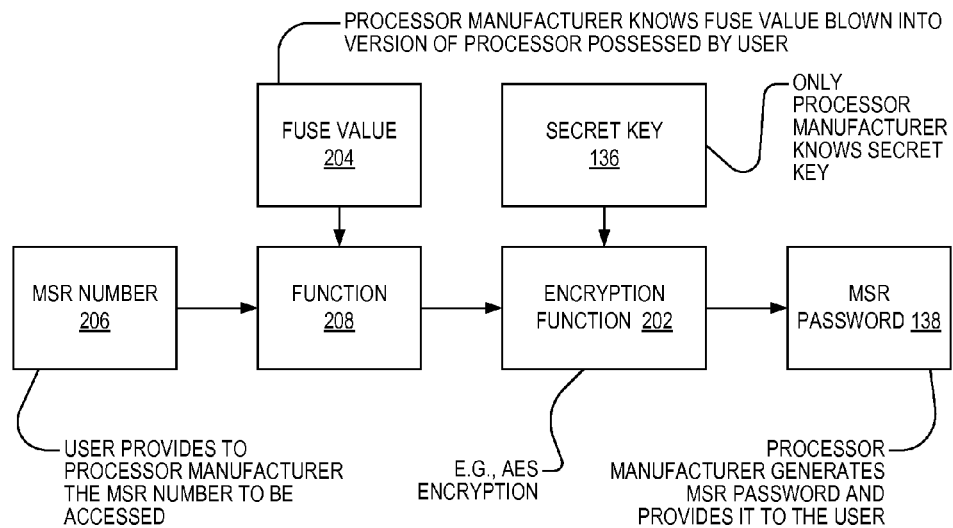
FIG. 2 is a block diagram pictorially describing the operation at blocks 402 through 406 of FIG. 4 according to the present invention.

At block 404, the manufacturer encrypts, using the secret key 136, a function 208 of the MSR 132 number received at block 402 and the first fuse value 204 associated with the first version, i.e., the user's version, to generate a first MSR password 138 using an encryption function 202, as shown in FIG. 2. In one embodiment, the function 208 is a Boolean exclusive-OR (XOR) function, although other functions are contemplated. For example, in another embodiment, concatenation is employed. In one embodiment, the encryption function 202 used by the manufacturer is AES encryption, although other embodiments are contemplated, such as DES. It is noted that the plain text input and the cipher text output of AES encryption have the same number of bits. Thus, in embodiments in which the function 208 of the MSR 132 number and first fuse value 204 contains fewer bits than the MSR password 138, the manufacturer pads the function 208 of the MSR 132 number and first fuse value 204 to the same number of bits as the MSR password 138 before AES encrypting the function 208 of the MSR 132 number and first fuse value 204 to generate the MSR password 138. Encrypting the MSR 132 number and first fuse value 204 using the secret key 136 using a strong encryption algorithm, such as AES, provides extremely high security for the password-protected MSRs 132 since it is statistically essentially impossible using current computing methods for anyone who does not know the secret key 136, even if he knows the encryption algorithm, to calculate the MSR password 138 even if he knows the MSR 132 number and first fuse value 204. In one embodiment, the secret key 136 is 128 bits and the generated MSR password 138 is 128 bits, although other embodiments are contemplated. Furthermore, it is statistically essentially impossible using current computing methods to discover the secret key 136 even if one knows the MSR 132 number and first fuse value 204 and the generated MSR password 138 provided by the manufacturer. In one embodiment, the manufacturer uses a program written to encrypt the function 208 of the MSR 132 number and first fuse value 204 to generate the MSR password 138. The program may run on any system that includes a processor capable of executing a program that performs the encryption algorithm used. Although not required, the system may include a microprocessor 100 according to the present invention that includes the cryptography unit 617 for performing the encryption algorithm. Flow proceeds to block 406.

At block 406, the manufacturer provides to the user the MSR password 138 generated at block 404, such as via telephone, email, website, ftp, paper mail, etc. It is noted that although the MSR password 138 is MSR-specific, it is not part-specific. Therefore, if the MSR password 138 becomes public information, persons other than the user to whom the manufacturer provided the MSR password 138 may also use the MSR password 138 to access the MSR 132 on the first version set of microprocessor 100 parts. While this may generally be desirable, as discussed above, circumstances may arise in which it is desirable to revoke access to the particular MSR 132 via the MSR password 138. Advantageously, incorporating the fuse 144 values makes it possible to revoke access to the particular MSR 132 via the first MSR password 138 on subsequent versions of the microprocessor 100, as described herein. Flow proceeds to block 408.

At block 408, the user program loads the MSR password 138 received from the manufacturer at block 406 into a register of the microprocessor 100. In one embodiment, the register is the XMM7 register of the x86 SSE programming environment. In an alternate embodiment, the user program loads the MSR password 138 into system memory and loads a general purpose register of the microprocessor 100 with a pointer to the memory location storing the MSR password 138. Flow proceeds to block 412.

At block 412, the user program executes a RDMSR or WRMSR instruction that specifies a particular MSR 132 to be read or written. Flow proceeds to block 414.

At block 414, the processor decodes the RDMSR or WRMSR instruction and transfers control to a microcode routine in the microcode ROM 604 of FIG. 1. The microcode determines whether the specified MSR 132 is in the list of password-protected MSRs. In one embodiment, architected MSRs are not included in the list of password-protected MSRs. In one embodiment, the list of password-protected MSRs may be changed by blowing fuses on the microprocessor, as described in U.S. patent application Ser. No. 12/391,781 (CNTR.2428), filed Feb. 24, 2009. Additionally, the microcode further determines the type of password protection associated with the MSR 132, namely whether the MSR 132 being accessed has an MSR-specific password, a part-specific password, or a password that is both MSR and part-specific. Flow proceeds to decision block 416.

At decision block 416, if the MSR 132 specified by the RDMSR/WRMSR instruction is not in the list of password-protected MSRs, flow proceeds to block 432; otherwise, flow proceeds to decision block 423.

At decision block 423, if the MSR 132 requires an MSR-specific password, flow proceeds to decision block 425; otherwise, flow proceeds to block 424.

At decision block 425, if the MSR 132 requires a part-specific password, flow proceeds to decision block 427; otherwise, flow proceeds to block 429.

At block 424, the microcode 604 causes the cryptography unit 617 to encrypt the manufacturing ID 134 using the secret key 136. Flow proceeds to block 431.

At block 427, the microcode 604 causes the cryptography unit 617 to encrypt the manufacturing ID 134 and MSR 132 number using the secret key 136. Flow proceeds to block 431.

At block 429, the microcode 604 causes the cryptography unit 617 to encrypt the function 208 of the MSR 132 number and fuse value read from the FCR 142 using the secret key 136, as shown in FIG. 3. Flow proceeds to block 431.

At block 431, the integer unit 610 compares the user-supplied MSR password 138 with the encryption result generated at block 429 (as shown in FIG. 3), block 424, or block 427, as appropriate. As shown in FIG. 3, the integer unit 610 generates a valid indicator 302 that indicates whether the encrypted function 208 of the MSR 132 number and fuse value read from the FCR 142 matches the MSR password 138. Flow proceeds to decision block 426.

At decision block 426, if the comparison performed at block 431 indicates a match, flow proceeds to block 432; otherwise, flow proceeds to block 428.

At block 428, the microprocessor 100 aborts the RDMSR/WRMSR instruction. In one embodiment, the microprocessor 100 generates a general protection fault. Flow proceeds to block 492.

At block 432, the processor executes the RDMSR or WRMSR instruction as requested by the user program. Flow proceeds to block 492.

At block 492, the microprocessor 100 manufacturer manufactures a second version set of microprocessor 100 parts. The second version includes a second fuse value selectively blown into the fuses 144 of FIG. 1 that is different from the first fuse value blown into the first version set of microprocessor 100 parts that was manufactured at block 401. Therefore, user attempts to access the MSR 132 on a second version microprocessor 100 part using the first password will fail; thus, the first password has been essentially revoked with respect to the second version set of microprocessor 100 parts. Advantageously, because the embodiments described herein employ strong encryption, such as AES encryption, it is statistically essentially impossible using current computing methods for anyone who does not know the secret key 136, even if he knows the first MSR password 138 generated at block 404, the MSR 132 number, the first fuse value, and the encryption algorithm, to calculate a second MSR password 138 that is now required to access the MSR 132 within a microprocessor 100 part of the second version. Furthermore, it is statistically essentially impossible using current computing methods to discover the secret key 136 even if one knows the MSR 132 number, first fuse value, first MSR password 138, second fuse value, and second MSR password 138. Flow ends at block 492.

In an alternate embodiment, to determine the validity of the user-supplied MSR password 138, rather than encrypting the function 208 of the MSR 132 number and fuse value read from the FCR 142 to generate a result to compare with the user-supplied MSR password 138, the microprocessor 100 decrypts the user-supplied MSR password 138 and compares the result with the function 208 of the MSR 132 number and fuse value read from the FCR 142. This embodiment is shown pictorially in FIG. 6.

Figures 5, 6:
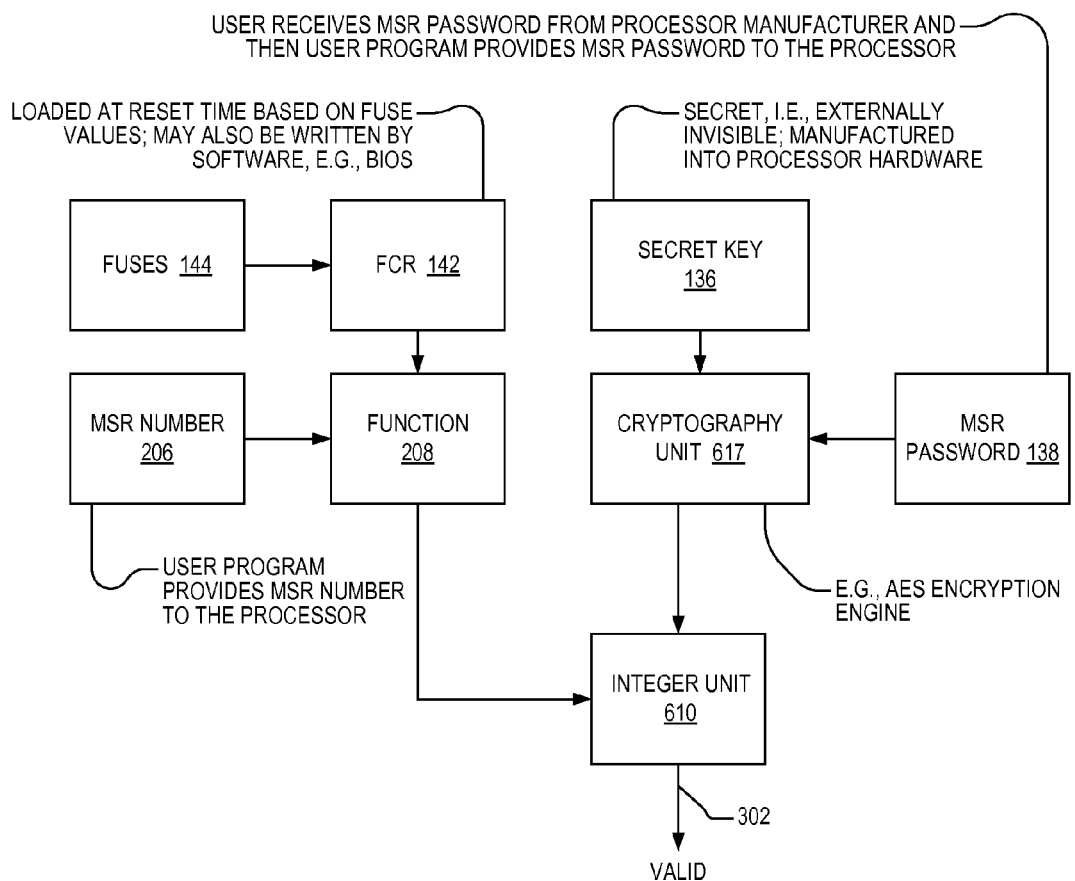
FIG. 5 is a flowchart illustrating operation according to an alternate embodiment of the present invention.
FIG. 6 is a block diagram pictorially describing the operation similar to FIG. 3 but according to an alternate embodiment of the present invention.

Referring now to FIG. 5, a flowchart illustrating operation according to an alternate embodiment of the present invention is shown. FIG. 5 describes a second manner, in addition to the first manner described with respect to block 492 of FIG. 4, in which the MSR-specific password may be revoked without blowing a new value into the fuses 144 of FIG. 1. Flow begins at block 592.

At block 592, the microprocessor 100 manufacturer provides a new BIOS release. The BIOS release includes code that runs at system boot time and writes a value to the FCR 142 of FIG. 1 that includes second fuse values that are different than the first fuse values used at block 401 of FIG. 4 to blow the fuses 144 of FIG. 1. Although the fuses 144 themselves are not physically altered, because the microprocessor 100 operates according to block 429 of FIG. 4 to encrypt the fuse value read from the FCR 142, by writing the FCR 142 the BIOS effectively reconfigures the microprocessor 100 part as a second version in the sense that the user can no longer use the first MSR-specific password generated at block 404 of FIG. 4 to access the specific MSR. That is, the BIOS has effectively revoked the first MSR-specific password with respect to the microprocessor 100 in the system with the new BIOS release. It is noted that the FCR 142 may also be password-protected according to any of the MSR password types described herein. Flow ends at block 592.

Although the present invention and its objects, features, and advantages have been described in detail, other embodiments are encompassed by the invention as well. For example, the fuse 144 values may also be employed with respect to the part-specific passwords associated with blocks 424 and 427 of FIG. 4. Although the need to revoke a part-specific password is unlikely, it may simplify the design of the microprocessor 100 to do so, such as the design of the microcode. Additionally, although embodiments have been described in which 128-bit encryption keys are employed, other embodiments are contemplated in which other size encryption keys are employed; and, although embodiments have been described in which AES encryption is employed, other embodiments are contemplated in which other encryption standards are employed.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as magnetic tape, semiconductor, magnetic disk, or optical disc (e.g., CD-ROM, DVD-ROM, etc.), a network, wire line, wireless or other communications medium. Embodiments of the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device which may be used in a general purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. A microprocessor, comprising:
    a model specific register (MSR), having an address;
    fuses, manufactured with a first predetermined value;
    a control register, wherein the microprocessor is adapted to initially load the first predetermined value from fuses into the control register, wherein the microprocessor is adapted to receive a second predetermined value into the control register from system software of a computer system comprising the microprocessor subsequent to initially loading the first predetermined value into the control register; and
    wherein the microprocessor is configured to prohibit access to the MSR by an instruction that provides a first password generated by encrypting a function of the first predetermined value and the MSR address with a secret key manufactured into the first instance of the microprocessor, and configured to enable access to the MSR by an instruction that provides a second password generated by encrypting the function of the second predetermined value and the MSR address with the secret key.

2. The microprocessor of claim 1, wherein the function of the first or second predetermined value and the MSR address comprises a Boolean exclusive-OR (XOR) of the first or second predetermined value and the MSR address.

3. The microprocessor of claim 1, wherein the function of the first or second predetermined value and the MSR address comprises a concatenation of the first or second predetermined value and the MSR address.

4. The microprocessor of claim 1, wherein the secret key is invisible external to the microprocessor.

5. The microprocessor of claim 1, wherein the microprocessor encrypts the first result with the secret key to generate the second result using the Advanced Encryption Standard (AES).

6. A method for revoking a first password used to access a model specific register (MSR) of a microprocessor, the method comprising:
    loading, by the microprocessor, a first predetermined value from fuses of the microprocessor into a control register of the microprocessor;
    writing a second predetermined value to the control register, wherein said writing is performed by system software of a computer system comprising the microprocessor subsequent to said loading the first predetermined value from the fuses into the control register;
    prohibiting access to the MSR, by the microprocessor, by an instruction that provides a first password generated by encrypting a function of the first predetermined value and an address of the MSR with a secret key manufactured into the first instance of the microprocessor; and
    enabling access to the MSR, by the microprocessor, by an instruction that provides a second password generated by encrypting the function of the second predetermined value and the address of the MSR with the secret key.

7. The method of claim 6, wherein the function of the first or second predetermined value and the MSR address comprises a Boolean exclusive-OR (XOR) of the first or second predetermined value and the MSR address.

8. The method of claim 6, wherein the function of the first or second predetermined value and the MSR address comprises a concatenation of the first or second predetermined value and the MSR address.

9. The method of claim 6, wherein the secret key is invisible external to the microprocessor.

10. The method of claim 6, wherein said encrypting comprises encrypting using the Advanced Encryption Standard (AES).

11. A computer program product encoded in at least one non-transitory computer usable medium for use with a computing device, the computer program product comprising:
    computer usable program code embodied in said medium, for specifying a microprocessor, the computer usable program code comprising:
        first program code for specifying a model specific register (MSR), having an address;
        second program code for specifying fuses, manufactured with a first predetermined value; and
        third program code for specifying a control register, wherein the microprocessor is adapted to initially load the first predetermined value from fuses into the control register, wherein the microprocessor is adapted to receive a second predetermined value into the control register from system software of a computer system comprising the microprocessor subsequent to initially loading the first predetermined value into the control register; and wherein the microprocessor is configured to prohibit access to the MSR by an instruction that provides a first password generated by encrypting a function of the first predetermined value and the MSR address with a secret key manufactured into the first instance of the microprocessor, and configured to enable access to the MSR by an instruction that provides a second password generated by encrypting the function of the second predetermined value and the MSR address with the secret key.

12. The computer program product of claim 11, wherein the function of the first or second predetermined value and the MSR address comprises a Boolean exclusive-OR (XOR) of the first or second predetermined value and the MSR address.

13. The computer program product of claim 11, wherein the function of the first or second predetermined value and the MSR address comprises a concatenation of the first or second predetermined value and the MSR address.

14. The computer program product of claim 11, wherein the secret key is invisible external to the microprocessor.

15. The computer program product of claim 11, wherein the microprocessor encrypts the first result with the secret key to generate the second result using the Advanced Encryption Standard (AES).

16. The computer program product of claim 11, wherein the at least one non-transitory computer usable medium is selected from the set of a disk, tape, or other magnetic, optical, or electronic storage medium.

\* \* \* \* \*